United States Patent
Cheng et al.

(10) Patent No.: US 8,385,438 B1
(45) Date of Patent: Feb. 26, 2013

(54) SYSTEM AND METHOD FOR ADAPTIVE SYNCHRONIZATION

(75) Inventors: Hao-Ren Cheng, Yuanli Township (TW); Gaspar Lee, Bade (TW)

(73) Assignee: QUALCOMM Incorporated, San Diego, CA (US)

( * ) Notice: Subject to any disclaimer, the term of this patent is extended or adjusted under 35 U.S.C. 154(b) by 1059 days.

(21) Appl. No.: 12/365,726

(22) Filed: Feb. 4, 2009

(51) Int. Cl.
    *H04K 1/10* (2006.01)

(52) U.S. Cl. ......... 375/260; 375/340; 375/343; 375/344

(58) Field of Classification Search ............... 375/260, 375/340, 343, 344, 224, 346, 35; 455/75; 370/206; 342/904
    See application file for complete search history.

(56) References Cited

U.S. PATENT DOCUMENTS

| | | | |
|---|---|---|---|
| 6,928,274 B2 | 8/2005 | Da Rocha et al. | |
| 7,599,453 B2 | 10/2009 | Wilhelmsson | |
| 7,602,853 B2 * | 10/2009 | Yang | 375/260 |
| 7,940,848 B2 | 5/2011 | Fechtel | |
| 8,064,507 B1 | 11/2011 | Cheng et al. | |
| 8,149,905 B1 | 4/2012 | Cheng et al. | |
| 2002/0042279 A1 | 4/2002 | Da Rocha et al. | |
| 2007/0211827 A1 | 9/2007 | Baggen et al. | |
| 2007/0297522 A1 | 12/2007 | Baggen et al. | |
| 2008/0089395 A1 | 4/2008 | Cairns | |
| 2008/0130674 A1 | 6/2008 | Ahmed-Ouameur et al. | |
| 2008/0240265 A1 | 10/2008 | Fechtel | |
| 2008/0247476 A1 * | 10/2008 | Pirot | 375/260 |
| 2009/0067520 A1 | 3/2009 | Gallizio et al. | |
| 2009/0129493 A1 | 5/2009 | Zhang et al. | |
| 2010/0040154 A1 | 2/2010 | Carbonelli et al. | |
| 2010/0142659 A1 * | 6/2010 | Gold-Gavriely et al. | 375/343 |

* cited by examiner

*Primary Examiner* — Shuwang Liu
*Assistant Examiner* — Helene Tayong
(74) *Attorney, Agent, or Firm* — Bever, Hoffman & Harms, LLP

(57) ABSTRACT

A system and method are disclosed to synchronize adaptively a transform window in a multiple sub-carrier communication system based on analysis of a time domain channel impulse response. A set of frequency domain channel estimates, derived from received and one-dimensional Wiener filter interpolated channel estimates, are transformed into a time domain channel impulse response estimate containing multiple, repeated constituent responses. Each order of the constituent responses in the time domain channel impulse response estimate is associated with a two-dimensional Wiener interpolation filter. The set of two-dimensional Wiener interpolation filters generate interpolated channel estimates to compare with received channel estimates to determine a best channel impulse response order of the constituent responses. The transform window is adaptively updated using the best channel impulse response order.

28 Claims, 11 Drawing Sheets

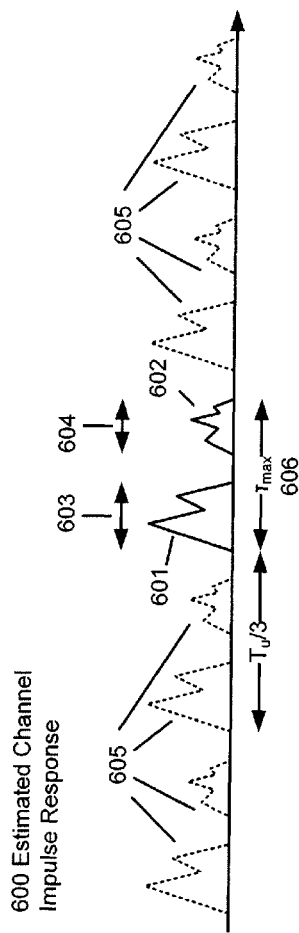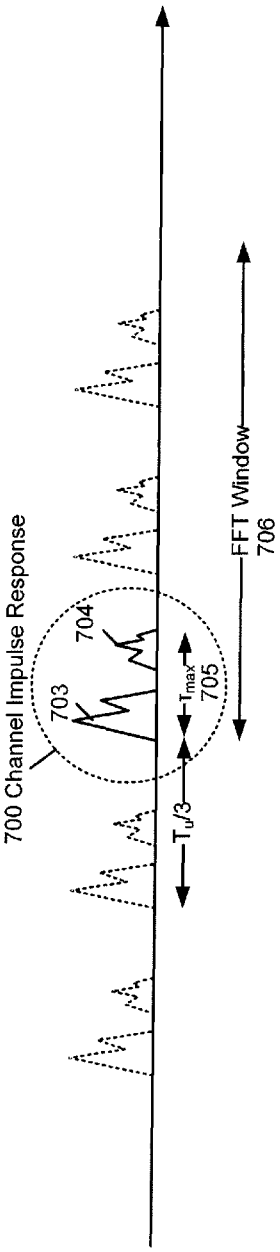

SYSTEM AND METHOD FOR ADAPTIVE SYNCHRONIZATION

CROSS REFERENCE TO RELATED APPLICATION

This application is related to commonly assigned, co-pending application Ser. No. 12/277,247, filed on Nov. 24, 2008, entitled "System and Method for Doppler Frequency Estimation", by Hao-Ren Cheng, Gaspar Lee and Chih-Yuan Chu, and Ser. No. 12/277,258, filed on Nov. 24, 2008, entitled "System and Method for Channel Estimation", by Hao-Ren Cheng, Gaspar Lee and Chih-Yuan Chu.

BACKGROUND OF THE INVENTION

1. Field of the Invention

The present invention relates to synchronization in general, and more specifically to adaptive FFT window synchronization in wireless OFDM systems.

2. Description of the Related Art

Advanced multimedia services continue to drive requirements for increasing data rates and higher performance in wireless systems. High performance communication systems such as those specified by the European terrestrial digital video broadcasting (DVB-T) standard and the Japanese integrated services digital broadcasting terrestrial standard (ISDB-T) may use communication methods based on Orthogonal Frequency Division Multiplexing (OFDM). The performance of an OFDM receiver may be sensitive to synchronization of a received sample sequence to a fast Fourier transform (FFT) window that converts the received sample sequence to a series of complex data values at a number of distinct sub-carrier frequencies. The DVB-T and ISDB-T standards may use a single-frequency network (SFN) technique, and performance of a wireless receiver in an SFN network may depend on the position of the FFT window relative to several simultaneously received signals from each of several transmitting antennas in the SFN network.

A received OFDM symbol in an OFDM system may consist of both data and pilot synchronization information transmitted on multiple sub-carriers multiplexed together and spanning multiple sample periods. Modulation and demodulation in an OFDM system may use an inverse fast Fourier transform (IFFT) at the transmitter and an FFT at the receiver respectively. At the transmitter a cyclic prefix of a section of the IFFT output for each OFDM symbol may be appended to the beginning of the OFDM symbol as a guard interval (GI) to provide some protection from inter-symbol interference (ISI). The length of the OFDM symbol before adding the guard interval may be known as the useful symbol period duration. At the receiver the cyclic prefix (guard interval) may be removed prior to the FFT demodulation by positioning appropriately an FFT window, whose size may be equal to the useful symbol period duration, along a received sample sequence. The FFT demodulation may transform the window of received time domain samples, in the received sample sequence, to a frequency domain (OFDM) symbol.

In a single frequency (or multi-path) network, the OFDM system may receive multiple, superimposed copies of a sequence of transmitted OFDM symbols. Each copy of the sequence of transmitted OFDM symbols may incur a different time delay and be scaled in amplitude by a different gain. The guard interval added to each OFDM symbol may provide flexibility to position the demodulation FFT window appropriately to minimize ISI and thereby improve performance. If a maximum delay spread between the beginning of the guard interval of the earliest received copy of a transmitted OFDM symbol and the beginning of the guard interval of the latest received copy of the transmitted OFDM symbol is less than the length of the guard interval, the FFT window may be positioned to eliminate ISI. For maximum delay spreads greater than the length of the guard interval, the FFT window may be positioned to minimize but not eliminate ISI. Prior art coarse synchronization methods may determine an FFT window position based on a correlation of the received data samples to estimate a location of the guard interval. Such coarse synchronization methods may not minimize ISI or maximize performance.

FIG. 1 illustrates an OFDM symbol sequence 100 including a series of OFDM symbols, each of useful symbol period duration $T_u$, appended by guard intervals of duration $T_g$. For example, guard interval 101 for OFDM symbol 102 repeats a last portion 103 of the OFDM symbol 102 before the beginning of the OFDM symbol 102. In a received sample sequence, the location of the guard intervals and useful symbol periods may be unknown at the receiver. An estimate of the location of the guard interval may be determined by correlating a first $T_g$ length segment 104 of the received sample sequence with a second $T_g$ length segment 105 separated by the useful symbol period duration $T_u$. As shown by plot 107, a correlation result may peak when the first $T_g$ length segment 104 is positioned over the guard interval. The demodulator's FFT window may then be positioned over the useful symbol period (102 and 103), although this positioning may not maximize performance in an SFN or multi-path network as explained next.

FIG. 2 illustrates two received copies (200 and 201) of a transmitted OFDM symbol sequence, each copy incurring different time delays and different amplitude gains. The horizontal axis may indicate time, while the vertical height of each sequence may indicate relative amplitude gain. A correlation of a guard interval width segment of sequence 200 may result in the dotted line plot 203, while a correlation of a guard interval width segment of sequence 201 may result in the dashed line plot 204. As the sequence 200 may be received earlier, i.e. with less time delay, than the sequence 201, a peak in the correlation plot 203 also appears earlier than a peak in the correlation plot 204. A combined correlation plot 202 for both sequences received together, which the receiver may observe, may contain two different peaks 205 and 206. If the maximum delay spread exceeds the guard interval width, then positioning a receiver's FFT window based on either of these peaks may not minimize ISI or maximize receiver performance. (The delay spread as shown in FIG. 2 is less than the guard interval width, but if the OFDM symbol sequence 201 is delayed further in time, i.e. to the right, the peak 206 may be pushed outside of the guard interval of the OFDM symbol sequence 200.) Thus there exists a need for an improved system and method for adaptive synchronization to position an FFT window that may provide improved receiver performance in a multi-path or single frequency network.

SUMMARY OF THE INVENTION

A system and method are disclosed to synchronize adaptively a transform window in a multiple sub-carrier communication system based on analysis of a time domain channel impulse response. A set of frequency domain channel estimates, derived from received and one-dimensional Wiener filter interpolated channel estimates, are transformed into a time domain channel impulse response estimate containing multiple, repeated constituent responses. Each order of the constituent responses in the time domain channel impulse response estimate is associated with a two-dimensional Wiener interpolation filter. The set of two-dimensional Wiener interpolation filters generate interpolated channel estimates to compare with received channel estimates to determine a best channel impulse response order of the constituent responses. The transform window is adaptively updated using the best channel impulse response order.

BRIEF DESCRIPTION OF THE DRAWINGS

FIG. 6 illustrates a periodic estimated channel impulse response including two main received groups.

FIG. 7 illustrates a pair of OFDM symbol sequences received with different time delays and amplitude gains corresponding with an estimated channel impulse response and an FFT window position with no ISI.

DETAILED DESCRIPTION

Figure 1:
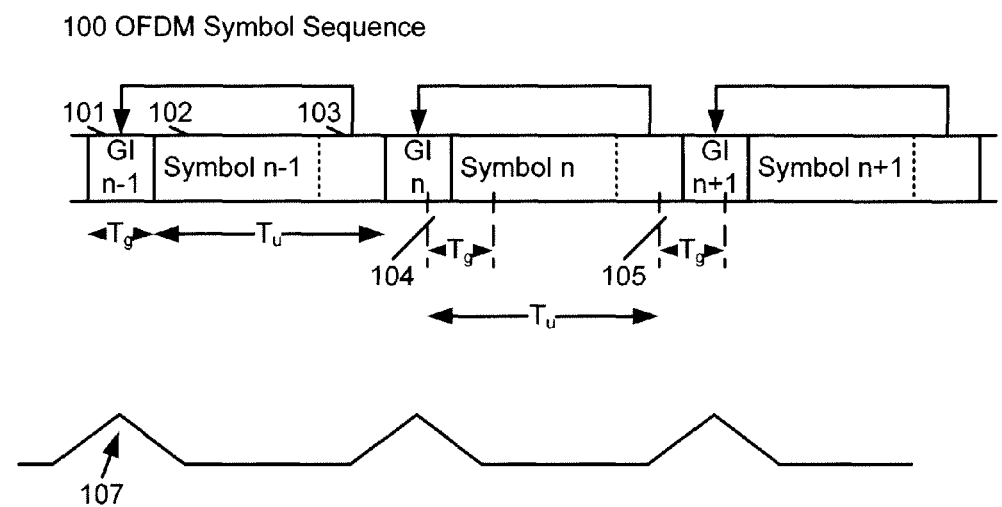
FIG. 1 illustrates an OFDM symbol sequence with added guard intervals and a correlation of a portion of the OFDM symbol sequence.
Figure 2:
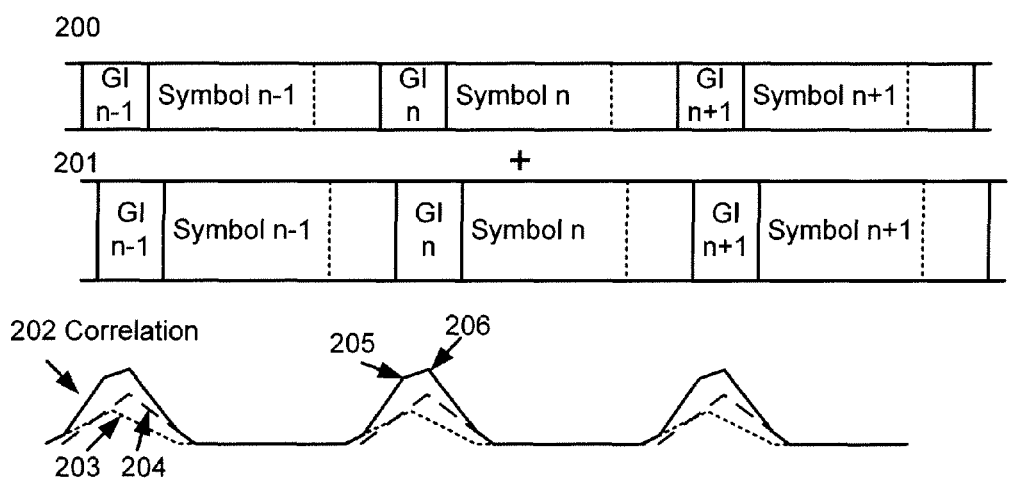
FIG. 2 illustrates two OFDM symbol sequences with added guard intervals, each with different time delays and amplitude gains, and a correlation of a portion of a combination of the two OFDM symbol sequences.
Figure 3:
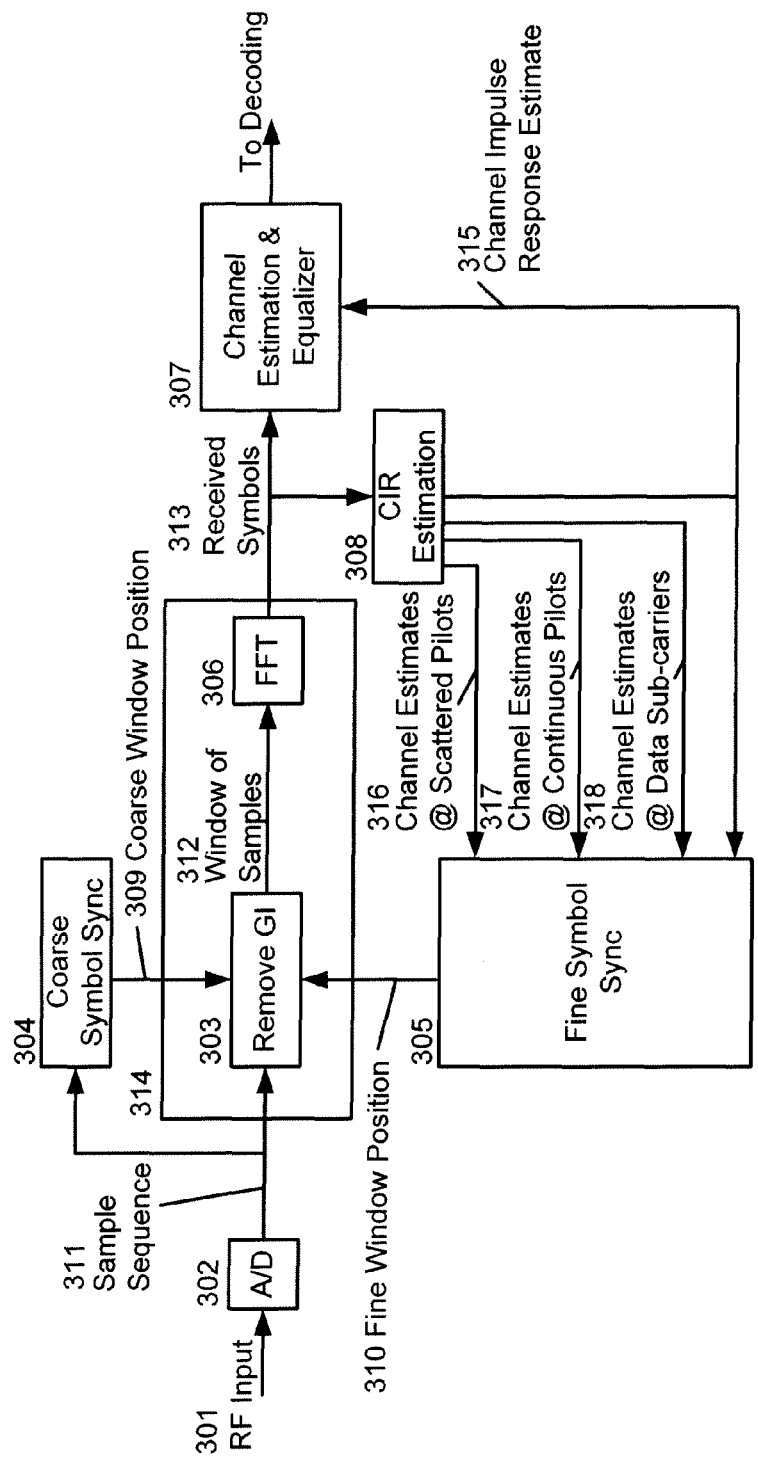
FIG. 3 illustrates processing blocks in an OFDM receiver including adaptive synchronization using channel impulse response estimation.

FIG. 3 illustrates a set of processing blocks in an OFDM wireless communication receiver that includes adaptive synchronization using channel impulse response estimation. An analog radio frequency (RF) signal 301 may be input to an analog to digital (A/D) conversion block 302 that may output a sample sequence 311. (The A/D block 302 may contain analog and/or digital filters in addition to an ND conversion function.) The sample sequence 311 output by the A/D block 302 may be processed by a coarse symbol synchronization block 304 that may determine an initial coarse window position 309 for the receiver's FFT window. A simple correlation algorithm, such as described above, or a more complex maximum likelihood (ML) or minimum mean squared error (MMSE) algorithm may be used to determine the coarse window position 309. The coarse window position 309 may be input to a transform block 314 containing a guard interval removal block 303 and an FFT block 306. Based on the coarse window position 309, a guard interval removal block 303 may delete a section of received samples from the received sample sequence 311 and output a window of samples 312 to an FFT block 306. The FFT block 306 may transform the window of samples 312 into a received OFDM symbol 313, which may be further processed by a channel estimation and equalizer block 307 prior to decoding.

Even though advanced ML and MMSE algorithms for the coarse window synchronization may provide a performance advantage in the presence of additive white Gaussian noise and moderate dispersion over a simple correlation algorithm, within an SFN network, there may be a non-negligible probability of failure for even the most complex coarse window algorithms using correlation techniques. Thus, additional processing of the received OFDM symbol 313 output by the FFT block 307 may be used to determine a better FFT window position. The received OFDM symbol 313 may be input to a channel impulse response (CIR) estimation block 308 that may determine a time domain CIR estimate 315 as well as a number of frequency domain channel estimates at individual sub-carrier frequencies, such as at scattered pilot sub-carriers 316, continuous pilot sub-carriers 317, or low data rate sub-carriers 318. A fine symbol synchronization block 305 may use the CIR estimate 315 along with the frequency domain channel estimates 316, 317 and 318 to determine a fine window position 310 that the guard interval removal block 303 may use instead of the coarse window position 309 determined earlier. The fine window position 310 may enable better receiver performance than the coarse window position 309, as the FFT window may be positioned better to remove or reduce residual ISI that may occur in the transform in the FFT block 306.

Figure 4:
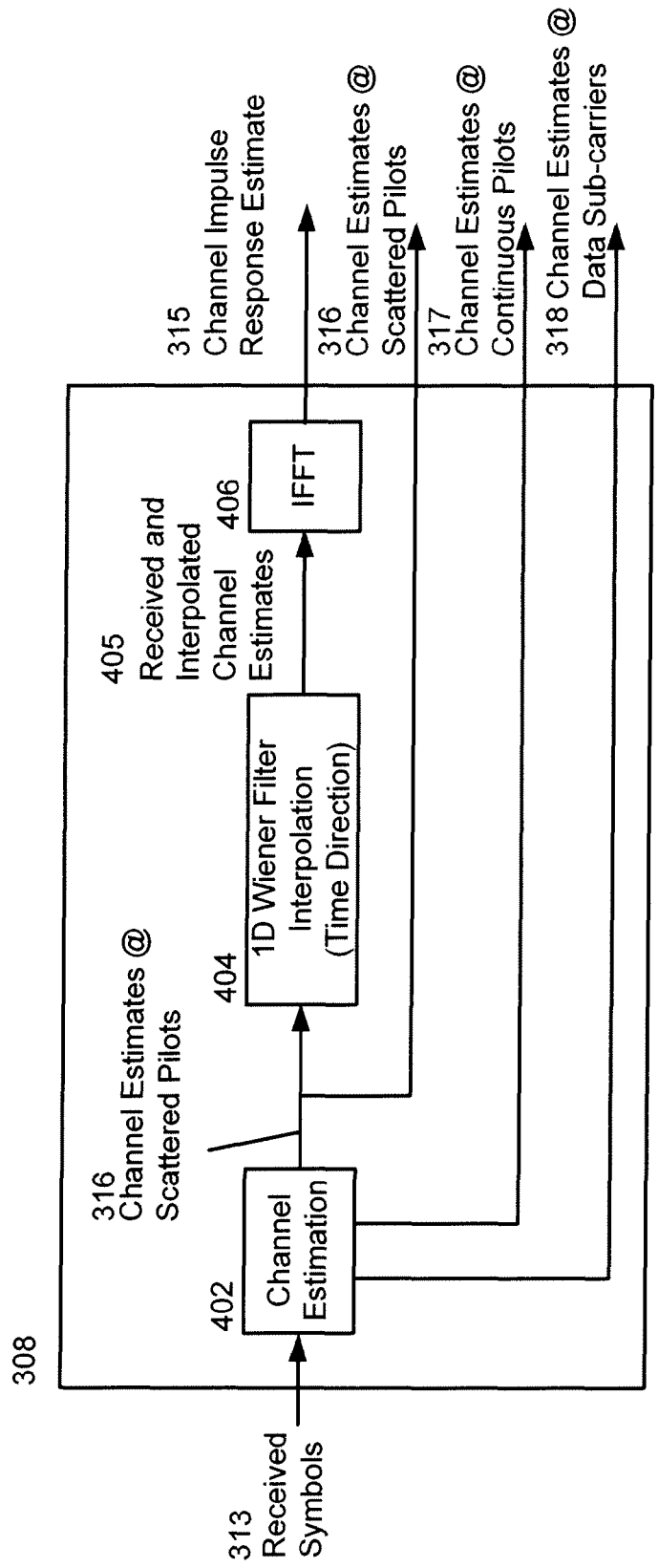
FIG. 4 illustrates processing blocks within a channel impulse response estimation block of the adaptive synchronization apparatus of FIG. 3.

FIG. 4 illustrates a set of processing blocks inside the CIR estimation block 308. A channel estimation block 402 may receive OFDM symbols 313 output by the FFT block 306. Each received OFDM symbol 313 may include a set of complex received values at a plurality of sub-carriers at different frequencies. Some of the sub-carriers may contain pilot values in every OFDM symbol 313, known as continuous pilots, while others may contain data values during some OFDM symbols 313 and pilot values in other OFDM symbols 313 at the same sub-carrier frequency, known as scattered pilots. Channel estimates at scattered pilots 316 and at continuous pilots 317 may be determined by the channel estimation block 402 by using known, pre-determined values for the pilots to ascertain how the channel affects their transmission. Channel estimates at low data rate carriers 318, where the signal to noise ratio may be high, may be calculated using hard decision algorithms to determine the unknown transmitted data values.

Figure 5:
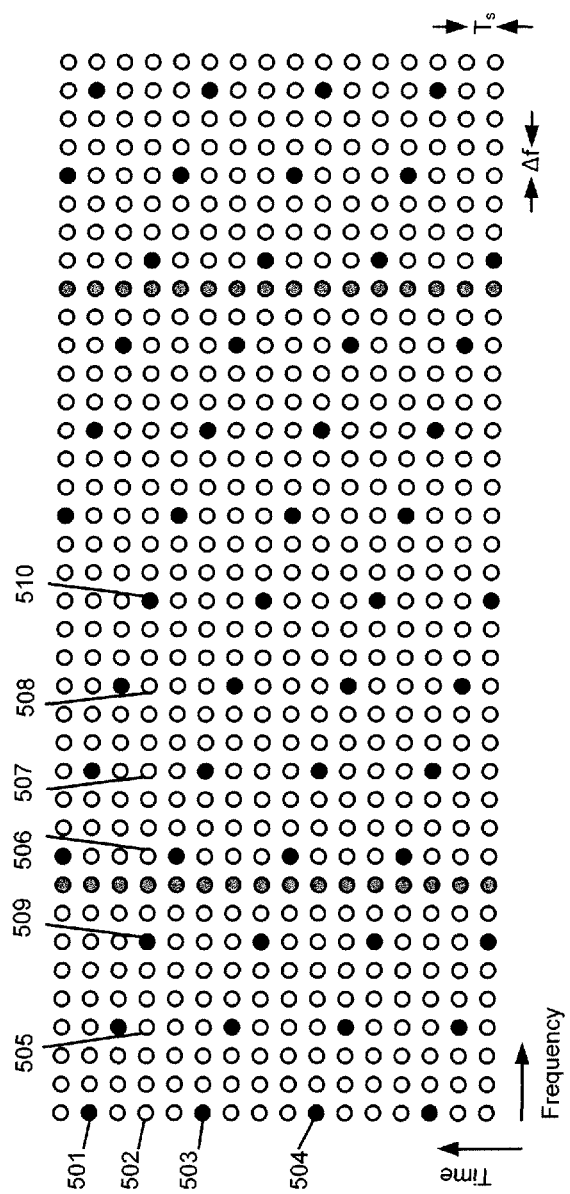
FIG. 5 illustrates a sequence of OFDM symbols including received data and scattered pilot sub-carriers.

FIG. 5 illustrates a series of received OFDM symbols where the horizontal axis may indicate different sub-carrier frequencies and the vertical axis may indicate time. Each column in FIG. 5 may represent received complex values at a particular sub-carrier frequency received over time in different OFDM symbols 313. Each row in FIG. 5 may represent received complex values for an OFDM symbol 313 across all sub-carrier frequencies. A solid black circle, such as 501, may indicate a received scattered pilot sub-carrier value while an open circle, such as 505, may indicate a received data sub-carrier value. A continuous pilot sub-carrier may be indicated as shown by a sequence of solid gray circles in a single column at a particular sub-carrier frequency. (FIG. 5 shows two different continuous pilots.)

For a given received OFDM symbol 313, i.e. a horizontal row of FIG. 5, a set of scattered pilot values may spread apart widely across different sub-carriers, e.g. one value for every 12 sub-carrier frequencies, which may be too sparse to provide an accurate CIR estimate. The channel estimation block 402 may collect a set of channel estimates 316 from the scattered pilot values over a number of different OFDM symbols and feed this set of channel estimates 316 to a one-dimensional Wiener interpolation filter 404 that may interpolate channel estimates along the time direction (within a column, at a particular sub-carrier frequency). For example, scattered pilot values, such as 501, 503 and 504 in the first column of FIG. 5, may provide channel estimates at the first column's sub-carrier frequency for the received OFDM symbols in which they respectively occur. The set of channel estimates from these scattered pilot values 501, 503 and 504 may be also used to interpolate channel estimates for other OFDM symbols at the same sub-carrier frequency (i.e., in the same column), such as a channel estimate for position 502 in the first column of FIG. 5. Similarly channel estimates based on scattered pilot values at other sub-carrier frequencies, such as within column 4, 8, etc., may be used to interpolate channel estimates for other OFDM symbols at the same sub-carrier frequency (in the same column). The set of channel estimates from the scattered pilots may then be combined with the interpolated channel estimates for each OFDM symbol to provide a "denser" set of channel estimates across the different sub-carrier frequencies. For example, using the scattered pilot values of FIG. 5, for a given OFDM symbol, the Wiener interpolation filter 404 may output a set of received and interpolated channel estimates 405 at sub-carrier frequencies spaced $3\Delta f$ apart, e.g. at positions 502, 505, 509, 506, 507, 508, 510, etc. assembled from channel estimates 316 based on the received scattered pilots and on interpolated channel estimates. The set of received and interpolated channel estimates 405 may be more closely spaced in frequency than channel estimates 316 based on the received scattered pilot values alone, thereby enabling a more accurate CIR estimate. For example in FIG. 5, the set of received and interpolated channel estimates 405 may be four times denser than the channel estimates @ scattered pilot values 316 only.

The assembled set of received and interpolated channels estimates 405 may be input to an IFFT block 406 that may output a time domain channel impulse response estimate 315. As the set of received and interpolated channel estimates 405 may be spaced $3\Delta f$ apart, the channel impulse response estimate 315 may be periodic with a period $T_{cir}=T_u/3$, where $\Delta f=1/T_u$. The channel impulse response estimate 315 output by the CIR estimation block 308 may be input to a fine symbol synchronization block 305 that may determine a fine window position 310 to align the guard interval removal block 303 and the subsequent FFT block 306 for better performance than may be achieved using the coarse window position 309.

FIG. 6 illustrates an exemplary estimated channel impulse response 600 output by the IFFT block 406 in the CIR estimation block 308. The channel impulse response 600 shown may include a first received response 601 with a delay spread 603 and a second received response 602 with a delay spread 604. The total maximum delay spread 606 across both the first received response 601 and the second received response 602 may be labeled $T_{max}$ 606. The channel impulse response 600 may be periodic with a period $T_{cir}=T_u/3$, where periodic repetitions are shown as dashed line received responses 605.

This periodicity may introduce an ambiguity as to which constituent responses within the estimated channel impulse response 600 represent the actual channel impulse response. The fine symbol synchronization block 305 may not know that the actual channel response may comprise constituent responses 601 and 602 out of the series of constituent responses in the estimated channel impulse response 600. The fine symbol synchronization block 305 may select a fine window position 310 by examining a number of possible actual channel responses. The placement of the fine window position 310 may determine the amount of residual inter-symbol interference as described next.

In the example illustrated in FIG. 7, the fine symbol synchronization block 305 may choose a fine window position 310 that aligns an FFT window 706 of the FFT block 306 to start at the beginning of a strongest constituent response 703 of a channel impulse response 700. The first constituent response 703 may correspond with a first transmitted sequence 701 and a second constituent response 704 may correspond with a second transmitted sequence 702. In this case, the FFT window 706 may align exactly with the $n^{th}$ symbol of the first transmitted sequence 701. As the second transmitted sequence 702 may be delayed with respect to the first transmitted sequence 701, the FFT window 706 may extend outside of the usable portion of the $n^{th}$ symbol of the second transmitted sequence 702 into the guard interval of the $n^{th}$ symbol. In the channel impulse response 700, the maximum delay spread $T_{max}$ 705 may be sufficiently short that the channel impulse response 700 may not extend beyond the start of the guard interval of the $n^{th}$ symbol; in this case the FFT window 706 may be positioned so that no ISI may occur.

Figure 8:
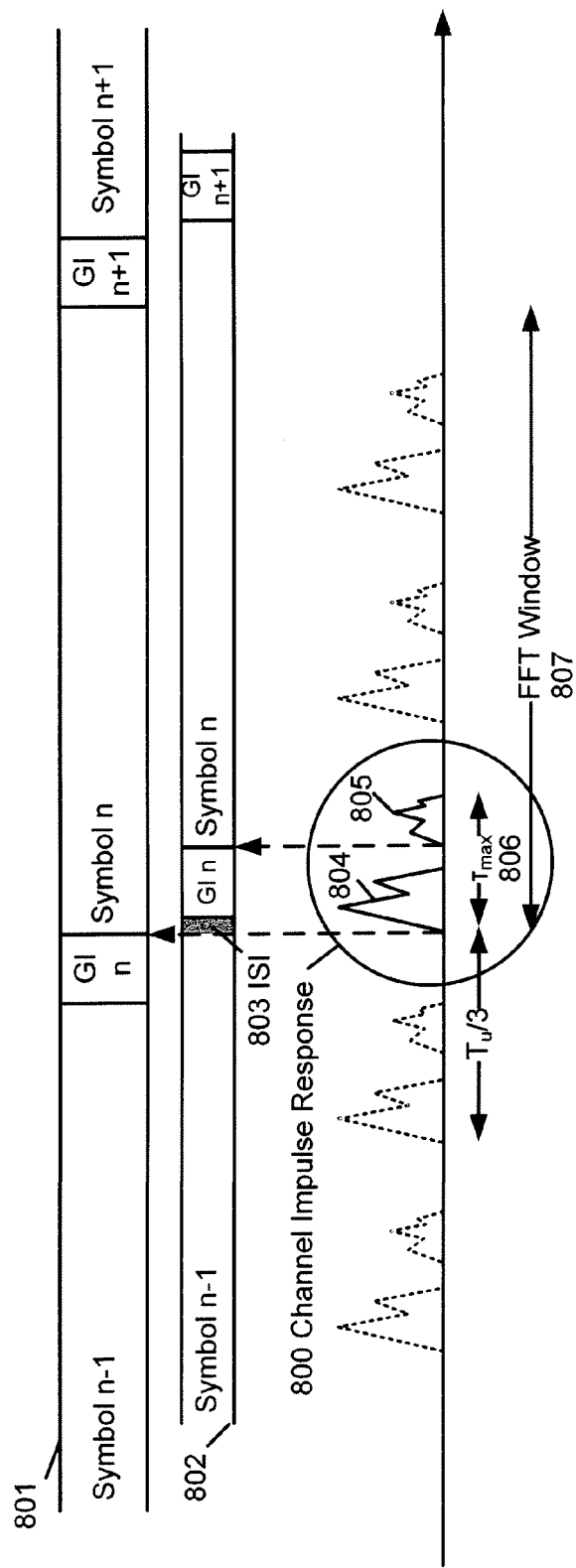
FIG. 8 illustrates a pair of OFDM symbol sequences received with different time delays and amplitude gains corresponding with an estimated channel impulse response and an FFT window position with pre-echo ISI.

In the example shown in FIG. 8, the guard interval may be shorter than the example shown in FIG. 7. In this case, the maximum delay spread $T_{max}$ 806 of a channel impulse response 800 may cause the start of the channel impulse response to extend beyond the start of the guard interval. In this case, positioning the FFT window 807 at the beginning of the first (and stronger) response 804 may result in ISI 803, as the end of symbol n–1 from the received sequence 802 may be included in the FFT window 807 for symbol n.

Figure 9:
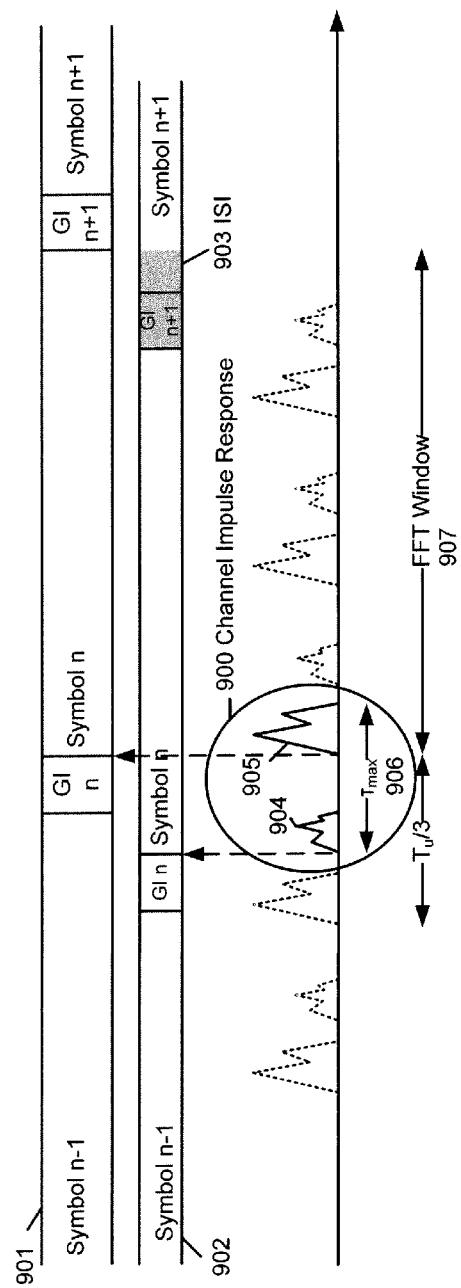
FIG. 9 illustrates a pair of OFDM symbol sequences received with different time delays and amplitude gains corresponding with an estimated channel impulse response and an FFT window position with post-echo ISI.

In the example shown in FIG. 9, positioning the FFT window 907 at the beginning of the second (and stronger) response 905 may result in ISI 903, as the beginning of symbol n+1 from the received sequence 902 may be included in the FFT window 907. Note that alternatively positioning the FFT window 907 at the beginning of the first (and weaker) response 904 in FIG. 9 may also incur ISI from the end of symbol n–1 from the second (and stronger) received sequence 901. When the maximum delay spread exceeds the guard interval, as illustrated in FIGS. 8 and 9, one may choose to position an FFT window to minimize rather than eliminate ISI. In a preferred embodiment, one may position an FFT window to include a response from the strongest path completely within an FFT window and to minimize any ISI incurred from portions of preceding or following symbols from weaker paths.

As described above, positioning an FFT window may affect the performance of the receiver due to inter-symbol interference. The channel impulse response estimate 315 output by the CIR estimation block 308 may provide additional information to position an FFT window for guard interval removal and subsequent FFT demodulation transformation. The estimated channel impulse response 600, as illustrated in FIG. 6 and repeated in FIG. 10, may be periodic with a period of $T_u/3$, which is less than the usable symbol period (and FFT window size) $T_u$. As illustrated by three different multi-path scenarios 1001, 1002 and 1003, in FIG. 10, a periodic channel impulse response 600 with two main paths may correspond to one of three different actual channel impulse responses. Each of these actual channel impulse responses may be valid, and which actual channel impulse response may correspond to the real communication channel may be not immediately obvious. The fine symbol synchronization block 305 may evaluate several candidate channel impulse responses to determine a best response.

Figure 10:
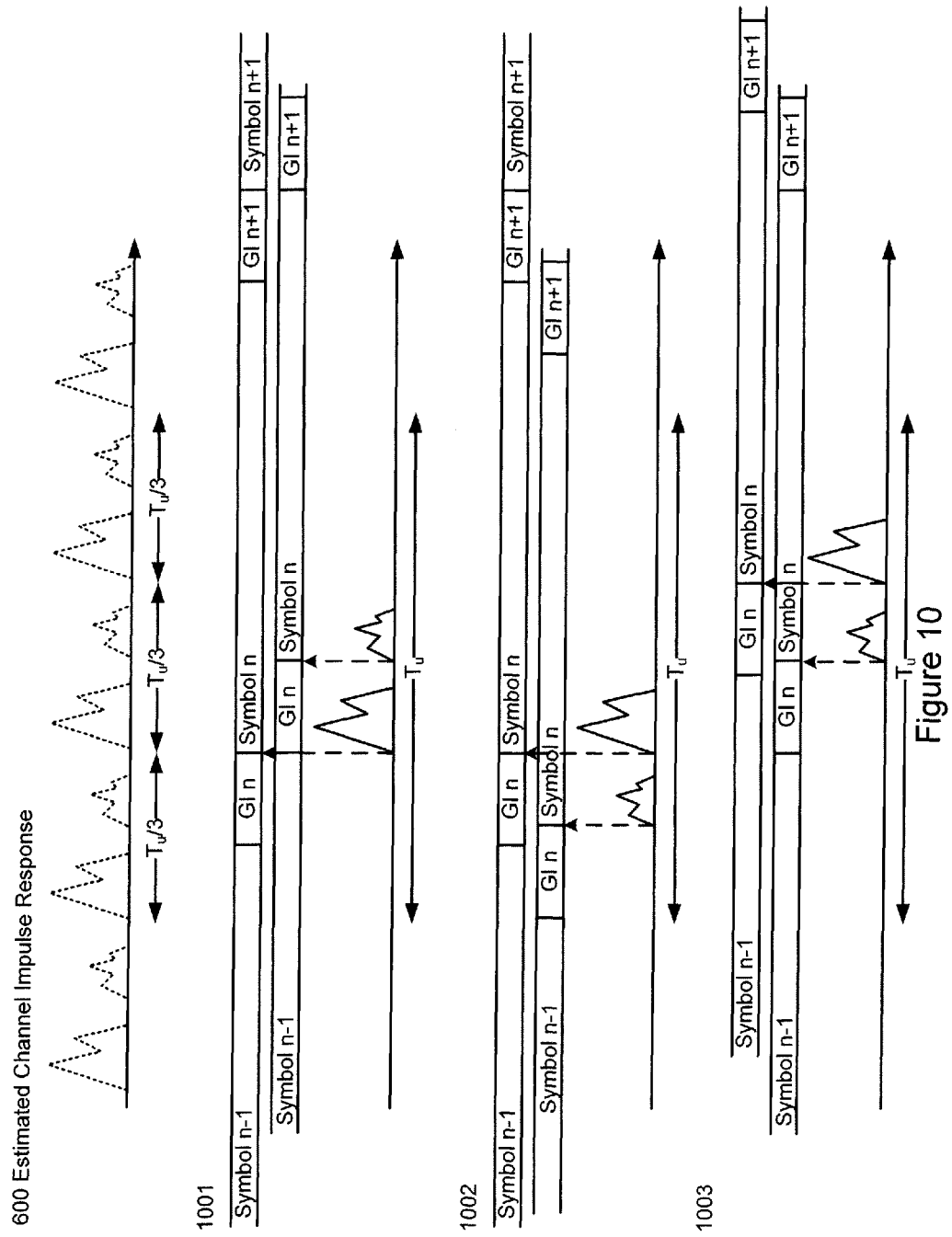
FIG. 10 illustrates three different channel impulse responses including different time delays of transmitted OFDM symbol sequences that may correspond with an estimated period channel impulse response.
Figure 11:
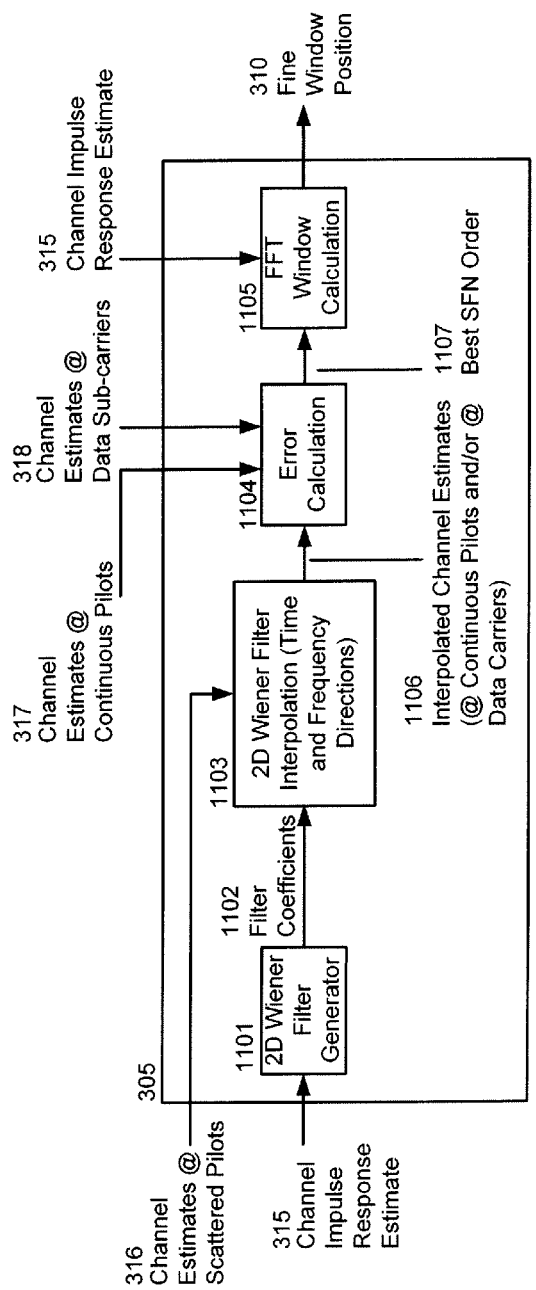
FIG. 11 illustrates processing blocks within a fine symbol synchronization block of the adaptive synchronization apparatus of FIG. 3.

The fine symbol synchronization block 305 may calculate a fine window position 310 by determining a "best" channel impulse response using the channel impulse response estimate 315 as well as channel estimates at the scattered pilot symbols 316, channel estimates at the continuous pilot symbols 317 and channel estimates at received data sub-carriers 318. FIG. 11 illustrates processing blocks within the fine symbol synchronization block 305. A two-dimensional (2D) Wiener filter generation block 1101 may output multiple sets of 2D Wiener filter coefficients 1102 based on the channel impulse response estimate 315 from the CIR estimation block 308. The 2D Wiener filter coefficients 1102 may be generated using a superposition method similar to that described in commonly assigned, co-pending application Ser. No. 12/277,247, filed on Nov. 24, 2008, entitled "System and Method for Doppler Frequency Estimation", by Hao-Ren Cheng, Gaspar Lee and Chih-Yuan Chu, and Ser. No. 12/277,258, filed on Nov. 24, 2008, entitled "System and Method for Channel Estimation", by Hao-Ren Cheng, Gaspar Lee and Chih-Yuan Chu, and incorporated by reference herein. For a channel impulse response estimate 315 containing N separate paths in a single frequency network or multi-path network, a total of 2N−1 sets of 2D Wiener filter coefficients may be generated. Each 2D Wiener filter may correspond to a different single frequency network (SFN) position order of receiving groups of signals along N separate paths. FIG. 10 illustrates three different SFN position orders for receiving signals along two separate paths in an estimated channel impulse response 600. Each SFN position order may correspond to a different actual channel impulse response. Additional details on generating the 2D Wiener filter coefficients are described later using FIG. 13.

Figure 12:
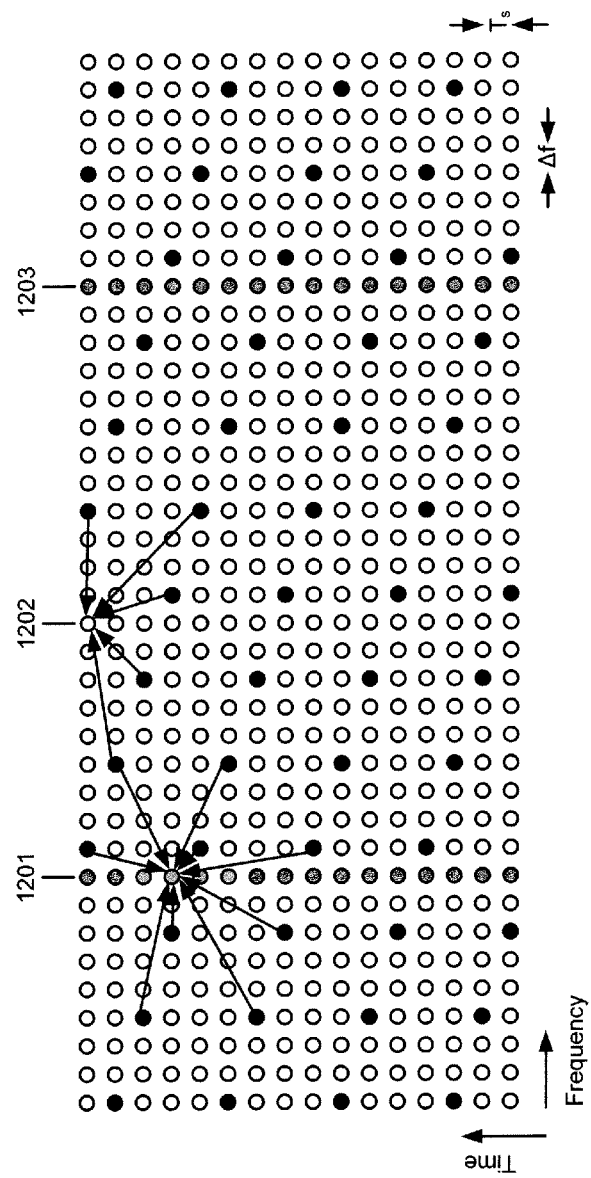
FIG. 12 illustrates 2D Wiener interpolation filtering to generate channel estimates at a continuous pilot sub-carrier or a data sub-carrier using received channel estimates at scattered pilot sub-carriers.

For each of the 2N−1 sets of 2D Wiener filter coefficients, a 2D Wiener filter interpolation block 1103 may generate interpolated channel estimates 1106 at continuous pilot sub-carrier positions (if available) and/or at select data sub-carrier positions based on the channel estimates 316 calculated at scattered pilots. The interpolated channel estimates 1106 at continuous pilots generated by the 2D Wiener filter interpolation block may be compared against the channel estimates 317 at continuous pilots calculated by the channel estimation block 402. Alternatively, if continuous pilots are not available the interpolated channel estimates 1106 at data sub-carrier positions may be compared against channel estimates derived from received data carriers 318 calculated by the channel estimation block 402. FIG. 12 illustrates a 2D Wiener filter interpolation of a channel estimate 1201 at a continuous pilot sub-carrier frequency in a particular OFDM symbol using channel estimates at surrounding scattered pilot sub-carrier frequencies from the same and different OFDM symbols. Similarly FIG. 12 illustrates a 2D Wiener filter interpolation of a channel estimate 1202 at a data sub-carrier using channel estimates from surrounding scattered pilots.

In equation form, the 2D Wiener filter interpolation may be written as described below. For a given received channel estimate $H_n$ at a continuous pilot sub-carrier frequency in an $n^{th}$ OFDM symbol, let $\{P_{n,m}\}$ represent a set of received channel estimates at nearby scattered pilot symbols, and let $\{C_{m,pos}\}$ represent a set of 2D Wiener filter coefficients, where m may index M different received channel estimates at scattered pilot symbols and pos may indicate the SFN order (i.e. the ordered "position" of paths in a candidate channel impulse response). An interpolated channel estimate $\hat{H}_{n,pos}$ at the continuous pilot sub-carrier frequency in the $n^{th}$ OFDM symbol may be generated by a 2D Wiener filter with coefficients $\{C_{m,pos}\}$ using the set of received channel estimates $\{P_{n,m}\}$ as $$\hat{H}_{n,pos} = \sum_{m=1:M} P_{n,m} C_{m,pos}. \quad (1)$$

An interpolation error $E_{n,pos}$ may be calculated at the continuous pilot sub-carrier frequency in the $n^{th}$ OFDM symbol as $$E_{n,pos} = \hat{H}_{n,pos} - H_n, \quad (2)$$

and the interpolation error $E_{n,pos}$ may be accumulated over a series of N different OFDM symbols for each SFN position order "pos" as $$E_{pos} = \sum_{n=1:N} E_{n,pos}. \quad (3)$$

A best SFN position order may be chosen as the SFN position order associated with the 2D Wiener interpolation filter that results in the smallest accumulated interpolation error $E_{pos}$. An averaged rather than accumulated interpolation error may also be used in Equation (3).

Given the best SFN position order determined above, an FFT window calculation block 1105 may choose a "best" actual channel impulse response for the channel impulse response estimate 315. For example, in FIG. 10, one of the three channel impulse responses shown may be chosen as "best" for the estimated channel impulse response 600. The FFT window calculation block 1105 may then determine the fine window position 310 for an FFT window over the "best" channel impulse response that optimizes a performance metric. One such metric described earlier may minimize residual inter-symbol interference included in each transformed OFDM symbol when using the fine window position 310 for the FFT.

For a communication system without continuous pilot sub-carriers available, such as in an ISDB-T system, a specific data sub-carrier with a low data rate (e.g. BPSK) may be used to estimate the "best" channel response. For a received value at the low data rate sub-carrier in a given OFDM symbol, a hard decision of the value transmitted may be used along with the actual received value to estimate the channel at that frequency for that OFDM symbol. A set of interpolated channel estimates at the low data rate sub-carrier may be used, as described above for interpolated channel estimates at a continuous pilot sub-carrier, to determine a best SFN position order. Wiener filter interpolation estimates for the low data rate sub-carrier may be determined in each OFDM symbol using received channel estimates from surrounding scattered pilot sub-carriers as shown for a data sub-carrier 1202 in FIG. 12. An interpolation error may be calculated per equation (2) and an accumulated error determined per equation (3) at the low data rate sub-carrier. A "best" SFN position order may then be chosen that minimizes the accumulated interpolation error. Note that the method to determine the best SFN position order described above may be extended to use multiple continuous pilot sub-carriers, such as two continuous pilots in columns 1201 and 1203 of FIG. 12, by accumulating interpolation errors calculated over both columns and then determining a best SFN position order.

Figure 13:
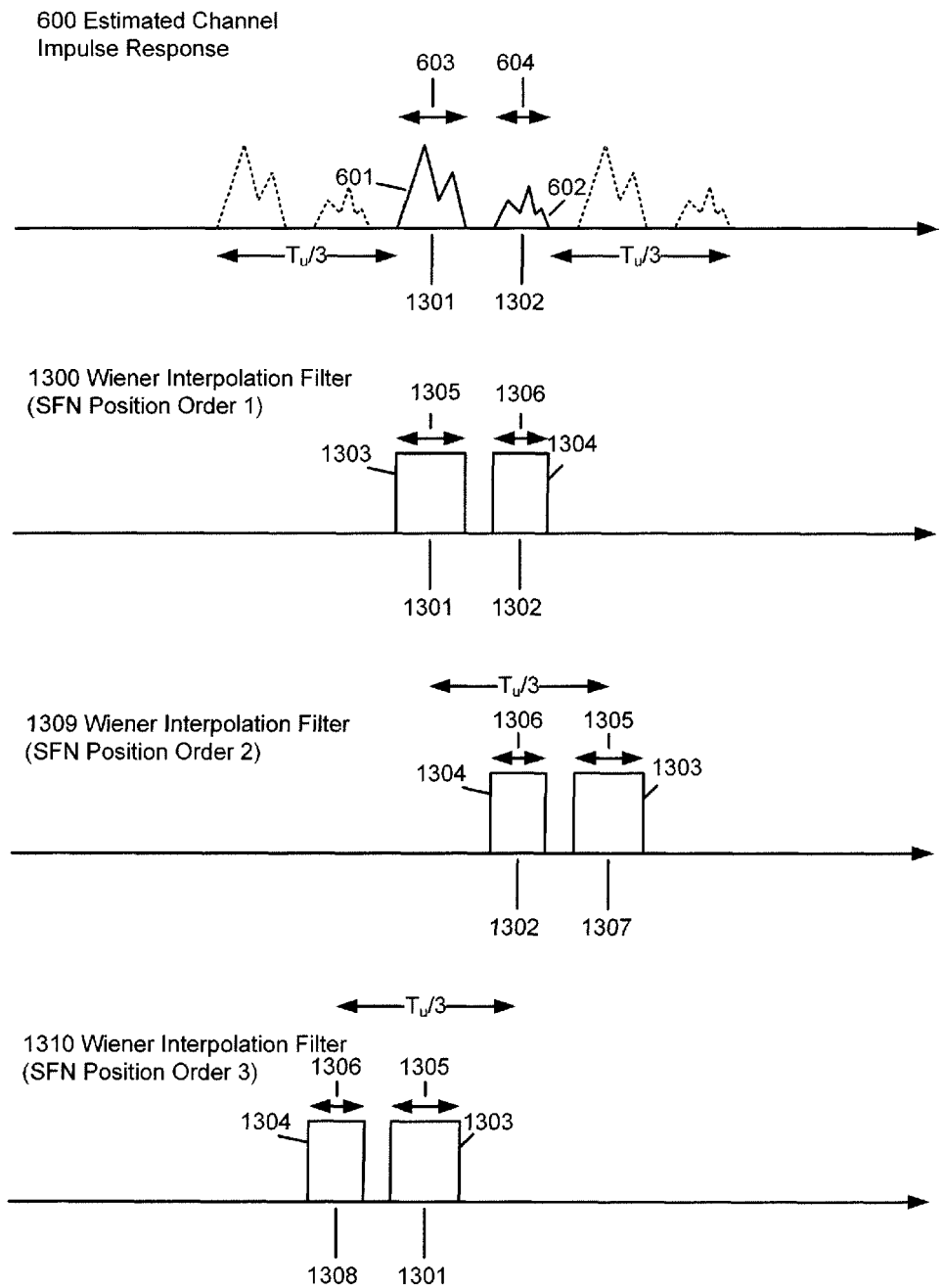
FIG. 13 illustrates three different 2D Wiener interpolation filters that correspond to three different single frequency network position orders for the periodic estimated channel impulse response of FIG. 6.

FIG. 13 illustrates how the estimated channel impulse response 600 may be used to derive a set of 2D Wiener interpolation filters, each filter associated with a different SFN position order. As an actual channel impulse response may vary in both time and frequency, the 2D Wiener interpolation filter may depend on two parameters, a time direction bandwidth and a frequency direction bandwidth. The time direction bandwidth may be determined using a Doppler estimation method as described in commonly assigned, co-pending application Ser. No. 12/277,247, filed on Nov. 24, 2008, entitled "System and Method for Doppler Frequency Estimation", by Hao-Ren Cheng, Gaspar Lee and Chih-Yuan Chu. While the time direction bandwidth may be tracked continuously and adjusted for each OFDM symbol, preferentially the time direction bandwidth may be estimated for a largest value and used for both larger and smaller time directional bandwidths encountered and for all paths in the estimated channel impulse response.

The frequency direction bandwidth may be estimated for each path or clustered group of paths in the estimated channel impulse response. The entire estimated channel impulse response 600 may be examined and separated into distinct components separated by a pre-determined number of successive time sample responses that may fall below a pre-determined amplitude threshold. For example, the estimated channel impulse response 600 in FIG. 13 may contain two constituent responses 601 and 602, each of which may be due to a different path in a multi-path network. One may refer to the channel impulse response 600 as having two paths. Each constituent response in the channel impulse response 600 may also correspond to a group of multi-path responses received clustered together and therefore indistinguishable as individual paths; one may refer to this channel impulse response 600 as having two "groups". The term "path", "group" and "constituent response" may be used synonymously. A frequency direction bandwidth 1305 for a first constituent Wiener interpolation filter 1303 associated with constituent response 601 may be determined using the constituent response's length 603 (in time). Similarly a frequency direction bandwidth 1306 for a second constituent Wiener interpolation filter 1304 may be determined using the constituent response length 604. Any of three different 2D Wiener interpolation filters may be constructed from the two constituent 2D Wiener interpolation filters by simply changing the center frequency positions of each of the constituent 2D Wiener filters. Note that the same time direction bandwidth may be used for both constituent 2D Wiener interpolation filters.

As the channel impulse response 600 may be periodic, as shown in FIG. 13 with two distinct groups, there may be three different possible actual channel impulse responses each corresponding to a different SFN position order as described earlier for FIG. 10. Three different 2D Wiener interpolation filters may be constructed, one for each of the three different SFN position orders using the constituent 2D Wiener interpolation filters. A first Wiener interpolation filter 1300 for SFN position order 1 may be constructed using the constituent filter 1303 centered at position 1301, the center of group 601, and the constituent filter 1304 centered at position 1302, the center of group 602. A second Wiener interpolation filter 1309 for SFN position order 2 may be constructed using the constituent filter 1303 centered at position 1307, the center of group 601 plus a circular periodic distance $T_u/3$, and the constituent filter 1304 centered at position 1302, the center of group 602. A third Wiener interpolation filter 1310 for SFN position order 3 may be constructed using the constituent filter 1303 centered at position 1301, the center of group 601, and the constituent filter 1304 centered at position 1308, the center of group 602 minus the circular periodic distance $T_u/3$. The three different Wiener interpolation filters 1300, 1309 and 1310 may be used to interpolate estimated channel responses as described earlier to determine the best SFN position order.

Although illustrative embodiments of the invention have been described in detail herein with reference to the accompanying figures, it is to be understood that the invention is not limited to those precise embodiments. The embodiments described herein are not intended to be exhaustive or to limit the invention to the precise forms disclosed. As such, many modifications and variations will be apparent. Accordingly, it is intended that the scope of the invention be defined by the following Claims and their equivalents.

The invention claimed is:

1. An apparatus in a multiple sub-carrier digital communication receiver, the apparatus including:
   a first transform block configured to transform, using a first window position, a sequence of time domain samples into a sequence of frequency domain symbols, each frequency domain symbol including a plurality of complex values at a first plurality of sub-carrier frequencies;
   a channel impulse response estimation block configured to calculate a time domain channel impulse response estimate based on the sequence of frequency domain symbols, wherein the channel impulse response estimation block is further configured to generate
      a first set of channel estimates at a second plurality of sub-carrier frequencies using a pre-determined set of transmit pilot symbols in the sequence of frequency domain symbols, and
      a second set of channel estimates at a third plurality of sub-carrier frequencies using the sequence of frequency domain symbols, wherein the second and third pluralities of sub-carrier frequencies are subsets of the first plurality of sub-carrier frequencies; and
   a symbol synchronization block configured to determine a second window position with which the first transform block is reconfigured to transform the sequence of time domain samples, wherein the symbol synchronization block determines the second window position in response to the time domain channel impulse response estimate, the first set of channel estimates and the second set of channel estimates.

2. An apparatus in a multiple sub-carrier digital communication receiver, the apparatus including:
   a first transform block configured to transform, using a first window position, a sequence of time domain samples into a sequence of frequency domain symbols, each frequency domain symbol including a plurality of complex values at a first plurality of sub-carrier frequencies;
   a channel impulse response estimation block configured to calculate a time domain channel impulse response estimate based on the sequence of frequency domain symbols, and configured to generate:
      a first set of channel estimates at a second plurality of sub-carrier frequencies using a pre-determined set of transmit pilot symbols in the sequence of frequency domain symbols, and
      a second set of channel estimates at a third plurality of sub-carrier frequencies using the sequence of frequency domain symbols, wherein the second and third pluralities of sub-carrier frequencies are subsets of the first plurality of sub-carrier frequencies; and a symbol synchronization block configured to determine a second window position with which the first transform block is reconfigured to transform the sequence of time domain samples based on the time domain channel impulse response estimate, wherein the symbol synchronization block includes:
- a Wiener filter generator configured to generate a plurality of sets of Wiener filter coefficients based on the time domain channel impulse response estimate, each set of Wiener filter coefficients associated with a channel impulse response order of constituent responses within the time domain channel impulse response estimate;
- a first Wiener filter interpolation block configured to generate a plurality of sets of interpolated channel estimates at a first sub-carrier frequency in the third plurality of sub-carrier frequencies using the first set of channel estimates, each set of interpolated channel estimates associated with a set of Wiener filter coefficients in the plurality of sets of Wiener filter coefficients;
- an error calculation block configured to determine a best channel impulse response order by comparing the plurality of sets of interpolated channel estimates to the second set of channel estimates at the first sub-carrier frequency; and
- a transform window calculation block configured to determine the second window position based on the best channel impulse response order.

3. The apparatus of claim 2 wherein the transform window calculation block determines the second window position by minimizing residual inter-symbol interference included in the sequence of frequency domain symbols when the first transform block uses the second window position.

4. The apparatus of claim 2 wherein the channel impulse response estimation block includes:
- a channel estimation block configured to generate the first and second sets of channel estimates from the sequence of frequency domain symbols;
- a second Wiener filter interpolation block configured to generate a third set of channel estimates at the second plurality of sub-carrier frequencies using the first set of channel estimates; and
- a second transform block configured to transform the second set of channel estimates into the time domain channel impulse response estimate.

5. The apparatus of claim 4 wherein the channel estimation block generates a channel estimate in the first set of channel estimates by dividing a Fourier transform output of a first frequency domain symbol by a transmit pilot symbol in the pre-determined set of transmit pilot symbols.

6. The apparatus of claim 4 wherein the channel estimation block generates a channel estimate in the second set of channel estimates by dividing a Fourier transform output of a first frequency domain symbol by an estimate of a data value transmitted in the first frequency domain symbol.

7. The apparatus of claim 4 wherein the error calculation block is configured to determine an interpolation error in a frequency domain symbol, at the first sub-carrier frequency in the third plurality of sub-carrier frequencies, for a first set of Wiener filter coefficients in the plurality of sets of Wiener filter coefficients, by calculating a magnitude difference between an interpolated channel estimate in the plurality of sets of interpolated channel estimates and a channel estimate in the second set of channel estimates.

8. The apparatus of claim 7 wherein the error calculation block is further configured to calculate an accumulated interpolation error for the first set of Wiener filter coefficients by accumulating, over a subsequence of frequency domain symbols in the sequence of frequency domain symbols, the interpolation error determined in each frequency domain symbol in the subsequence of frequency domain symbols.

9. The apparatus of claim 7 wherein the error calculation block is further configured to calculate an average interpolation error for the first set of Wiener filter coefficients by averaging, over a subsequence of frequency domain symbols in the sequence of frequency domain symbols, the interpolation error determined in each frequency domain symbol in the subsequence of frequency domain symbols.

10. The apparatus of claim 8 wherein the error calculation block is further configured to select as the best channel impulse response order the channel impulse response order for the set of Wiener filter coefficients with a smallest accumulated interpolation error.

11. The apparatus of claim 9 wherein the error calculation block is further configured to select as the best channel impulse response order the channel impulse response order for the set of Wiener filter coefficients with a smallest average interpolation error.

12. An adaptive synchronization method in a multiple-subcarrier digital communication receiver, the method including:
- transforming a sequence of time domain samples, using a first window position, into a sequence of frequency domain symbols, each frequency domain symbol including a plurality of complex values at a first plurality of sub-carrier frequencies;
- calculating a time domain channel impulse response estimate from the sequence of frequency domain symbols by:
  - generating a first set of channel estimates at a second plurality of sub-carrier frequencies using a pre-determined set of transmit pilot symbols in the sequence of frequency domain symbols, wherein the second plurality of sub-carrier frequencies is a subset of the first plurality of sub-carrier frequencies;
  - generating a second set of channel estimates at the second plurality of sub-carrier frequencies from the first set of channel estimates using a first Wiener filter; and
  - transforming the second set of channel estimates into the time domain channel impulse response estimate using a Fourier transform; and
- determining a second window position for transforming the sequence of time domain samples based on the time domain channel impulse response estimate.

13. The method of claim 12 wherein determining the second window position includes:
- generating a third set of channel estimates at a third plurality of sub-carrier frequencies using the sequence of frequency domain symbols;
- generating a plurality of sets of Wiener filter coefficients based on the time domain channel impulse response estimate, each set of Wiener filter coefficients associated with a channel impulse response order of constituent responses within the time domain channel impulse response estimate;
- generating a plurality of sets of interpolated channel estimates at a first sub-carrier frequency in the third plurality of sub-carrier frequencies using the first set of channel estimates, each set of interpolated channel estimates associated with a set of Wiener filter coefficients in the plurality of sets of Wiener filter coefficients;

determining a best channel impulse response order by comparing the plurality of sets of interpolated channel estimates to the third set of channel estimates at the first sub-carrier frequency; and determining the second window position based on the best channel impulse response order.

14. The method of claim 13 wherein determining the second window position includes minimizing residual inter-symbol interference included in the sequence of frequency domain symbols when the first transform block uses the second window position.

15. The method of claim 13 further including:

generating an interpolation error in a frequency domain symbol, at the first sub-carrier frequency in the third plurality of sub-carrier frequencies, for a first set of Wiener filter coefficients in the plurality of sets of Wiener filter coefficients, by calculating a magnitude difference between an interpolated channel estimate in the plurality of sets of interpolated channel estimates and a channel estimate in the third set of channel estimates.

16. The method of claim 15 further including:

calculating an accumulated interpolation error for the first set of Wiener filter coefficients by accumulating, over a subsequence of frequency domain symbols in the sequence of frequency domain symbols, the interpolation error determined in each frequency domain symbol in the subsequence of frequency domain symbols.

17. The method of claim 15 further including:

calculating an average interpolation error for the first set of Wiener filter coefficients by averaging, over a subsequence of frequency domain symbols in the sequence of frequency domain symbols, the interpolation error determined in each frequency domain symbol in the subsequence of frequency domain symbols.

18. The method of claim 16 wherein determining the best channel impulse response order selects the channel impulse response order for the set of Wiener filter coefficients with a smallest accumulated interpolation error.

19. The method of claim 17 wherein determining the best channel impulse response order selects the channel impulse response order for the set of Wiener filter coefficients with a smallest average interpolation error.

20. The apparatus of claim 1, wherein the symbol synchronization block further comprises a filter generator that generates a plurality of sets of filter coefficients based on the time domain channel impulse response estimate, each set of filter coefficients associated with a channel impulse response order of constituent responses within the time domain channel impulse response estimate.

21. The apparatus of claim 20, wherein the symbol synchronization block further comprises a filter interpolation block that generates a plurality of sets of interpolated channel estimates in response to the plurality of sets of filter coefficients and the first set of channel estimates.

22. The apparatus of claim 21, wherein the symbol synchronization block further comprises an error calculation block that determines a best channel impulse response order by comparing the plurality of sets of interpolated channel estimates to the second set of channel estimates.

23. The apparatus of claim 22, wherein the symbol synchronization block further comprises a transform window calculation block that selects the second window position based on the best channel impulse response order.

24. A method comprising:

transforming a sequence of time domain samples, using a first window position, into a sequence of frequency domain symbols, each frequency domain symbol including a plurality of complex values at a first plurality of sub-carrier frequencies;

generating a first set of channel estimates at a second plurality of sub-carrier frequencies using a pre-determined set of transmit pilot symbols in the sequence of frequency domain symbols;

calculating a time domain channel impulse response estimate in response to the first set of channel estimates;

generating a second set of channel estimates at a third plurality of sub-carrier frequencies using the sequence of frequency domain symbols, wherein the second and third pluralities of sub-carrier frequencies are subsets of the first plurality of sub-carrier frequencies; and determining a second window position for transforming the sequence of time domain samples in response to the time domain channel impulse response estimate, the first set of channel estimates and the second set of channel estimates.

25. The method of claim 24, further comprising generating a plurality of sets of filter coefficients based on the time domain channel impulse response estimate, each set of filter coefficients associated with a channel impulse response order of constituent responses within the time domain channel impulse response estimate.

26. The method of claim 25, further comprising generating a plurality of sets of interpolated channel estimates in response to the plurality of sets of filter coefficients and the first set of channel estimates.

27. The method of claim 26, further comprising determining a best channel impulse response order by comparing the plurality of sets of interpolated channel estimates to the second set of channel estimates.

28. The method of claim 27, further comprising determining the second window position based on the best channel impulse response order.

* * * * *